(12) United States Patent
Mosinskis

(10) Patent No.: US 7,796,842 B2
(45) Date of Patent: Sep. 14, 2010

(54) AC-COUPLED DIFFERENTIAL DRIVE CIRCUIT FOR OPTO-ELECTRONIC MODULATORS

(75) Inventor: Paulius Mindaugas Mosinskis, Richlandtown, PA (US)

(73) Assignee: Lightwire, Inc., Allentown, PA (US)

( * ) Notice: Subject to any disclaimer, the term of this patent is extended or adjusted under 35 U.S.C. 154(b) by 487 days.

(21) Appl. No.: 11/973,190

(22) Filed: Oct. 5, 2007

(65) Prior Publication Data

US 2008/0088354 A1 Apr. 17, 2008

Related U.S. Application Data

(60) Provisional application No. 60/849,893, filed on Oct. 7, 2006.

(51) Int. Cl.
G02F 1/035 (2006.01)
G06G 7/14 (2006.01)
(52) U.S. Cl. .................. 385/2; 385/1; 385/14; 385/129; 385/130; 385/132; 327/361
(58) Field of Classification Search .................. 385/1, 385/2, 3, 14, 40, 129, 130, 131, 132; 398/134, 398/135, 136, 137, 138, 139; 327/361
See application file for complete search history.

(56) References Cited

U.S. PATENT DOCUMENTS

| | | | |
|---|---|---|---|
| 6,192,167 B1 * | 2/2001 | Kissa et al. ..................... 385/3 |
| 6,281,030 B1 | 8/2001 | Shimizu ..................... 438/31 |
| 6,374,000 B1 | 4/2002 | Olesen ........................... 385/2 |
| 6,556,728 B2 | 4/2003 | Olesen ........................... 385/2 |
| 6,590,691 B1 | 7/2003 | Nagra et al. ................. 359/237 |
| 6,687,039 B2 | 2/2004 | Shirai ......................... 359/254 |
| 6,810,159 B2 | 10/2004 | Olesen ........................... 385/2 |
| 6,836,185 B1 | 12/2004 | Pobanz ....................... 330/260 |
| 6,845,198 B2 | 1/2005 | Montgomery et al. ......... 385/30 |
| 7,010,179 B2 * | 3/2006 | Hatta et al. ..................... 385/1 |
| 7,065,301 B2 | 6/2006 | Shastri et al. ............... 398/183 |
| 7,099,596 B2 | 8/2006 | Watanabe et al. ........... 398/183 |
| 7,227,878 B1 | 6/2007 | Choi et al. ............... 372/38.02 |
| 7,245,413 B2 | 7/2007 | Miura et al. ................. 359/245 |
| 7,408,693 B2 * | 8/2008 | Kissa et al. ................. 359/245 |
| 7,536,112 B2 * | 5/2009 | Yonenaga et al. ........... 398/198 |
| 7,542,631 B2 * | 6/2009 | Yonenaga et al. ............. 385/5 |
| 7,657,130 B2 * | 2/2010 | Shastri et al. .................. 385/2 |
| 2004/0202397 A1 * | 10/2004 | Hatta et al. ..................... 385/2 |
| 2008/0088354 A1 * | 4/2008 | Mosinskis ................... 327/361 |

* cited by examiner

*Primary Examiner*—Brian M Healy
(74) *Attorney, Agent, or Firm*—Wendy W. Koba

(57) ABSTRACT

An AC-coupled differential drive circuit for an optical modulator is utilized, where a common "node" is defined between top (or bottom) plates of the modulator arms themselves (the "arms" of a modulator taking the form of MOS capacitors). A low pass filter is disposed between the differential driver output and the modulator's common node to provide the desired AC coupling by filtering out the DC bias voltage of the driver circuit itself without the need for a separate, external AC coupling capacitor. An independent, adjustable DC potential can then be applied to the common node, and will appear in a balanced manner across each arm of the modulator to provide the desired DC bias for the modulator independent of the DC bias of the driver circuit.

6 Claims, 3 Drawing Sheets

AC-COUPLED DIFFERENTIAL DRIVE CIRCUIT FOR OPTO-ELECTRONIC MODULATORS

CROSS-REFERENCE TO RELATED APPLICATION

This application claims the benefit of U.S. Provisional Application No. 60/849,893, filed Oct. 7, 2006.

TECHNICAL FIELD

The present invention relates to an electrical driver circuit for an opto-electronic modulator and, more particularly, to an AC-coupled differential driver that allows for the bias point of the modulator to be adjusted independently of the voltage swing of the electrical drive signal.

BACKGROUND OF THE INVENTION

Optical transmission systems are generally based on one of two methods of modulation of an optical signal, either direct modulation or external modulation. In the first of these methods, the bias current applied to a laser is modulated, turning the laser "on" and "off". The disadvantage of this method is that when higher switching speeds are required, the dynamic behavior of the semiconductor material of the laser itself introduces distortion, primarily in the form of chirp. External modulation of an optical signal produces a modulated optical output signal with significantly reduced chirp, and external modulators have become preferred for high speed applications. In particular, electro-optic modulators such as Mach Zehnder interferometers (MZIs) are typically used for high speed applications.

For many years, external modulators have been made out of electro-optic material, such as lithium niobate. Optical waveguides are formed within the electro-optic material, with metal contact regions disposed on the surface of each waveguide arm. The application of a voltage to a metal contact will modify the refractive index of the waveguide region underneath the contact, thus changing the speed of propagation along the waveguide. By applying the voltage(s) that produce a π phase shift between the two arms, a nonlinear (digital) Mach-Zehnder modulator is formed. In particular, the optical signal is launched into the waveguide and the I/O electrical digital signal is applied to the contacts (using proper voltage levels, as mentioned above). The optical output is then "modulated" to create an optical I/O output signal. A similar result is possible with a linear (analog) optical output signal.

Although this type of external modulator has proven extremely useful, there is an increasing desire to form various optical components, subsystems and systems on silicon-based platforms. It is further desirable to integrate the various electronic components associated with such systems (for example, the input electrical data drive circuit for an electro-optic modulator) with the optical components on the same silicon substrate. Clearly, the use of lithium niobate-based optical devices in such a situation is not an option. Various other conventional electro-optic devices are similarly of a material (such as III-V compounds) that are not directly compatible with a silicon platform.

Recent advances have been made in the capability of forming optical devices, such as the modulator described above, within a silicon platform, based on free carrier modulation. In this configuration, the phase-shifting elements forming the modulator arms take the form of MOS capacitors formed along silicon waveguides. An applied voltage induces an accumulation of charges near the gate dielectric of the capacitor which, in turn, modifies the refractive index profile of the waveguide and ultimately the optical phase of the light passing through the waveguide. See, for example, U.S. Pat. Nos. 6,845,198 and 7,065,301, both assigned to the assignee of this application.

The application of the electrical drive signal to the capacitor structures of the phase-shifting elements has been found to be directly impacted by the DC bias voltage of the data itself. A remaining need in this technology is the ability to adjust the DC bias of the high speed electrical data independent of the peak-to-peak swing of the voltage applied to the modulator.

SUMMARY OF THE INVENTION

The present invention addresses the above concerns of the prior art and is directed to an electrical driver circuit for an opto-electronic modulator and, more particularly, to an AC-coupled differential driver that allows for the bias point of the modulator to be adjusted independently of the voltage swing of the electrical drive signal.

In accordance with the present invention, an AC-coupled differential drive circuit for an optical modulator is utilized, where a common "node" is defined between top (or bottom) plates of the modulator arms themselves (as described above, the "arms" of an SOI-based modulator take the form of MOS capacitors). A low pass filter is disposed between the differential driver output and the modulator to provide the desired AC coupling by filtering out the DC bias voltage of the driver circuit itself. A separate, adjustable DC potential can then be applied to the common node, and will appear in a balanced manner across each arm of the modulator. This DC potential is then adjusted to "tune" the bias voltage associated with the modulator to the desired level required for the operating conditions of the modulator. The inventive arrangement eliminates the need for an external coupling capacitor, thus extending the available bandwidth for the modulator, while still providing the desired AC-coupled configuration.

Other and further arrangements and aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
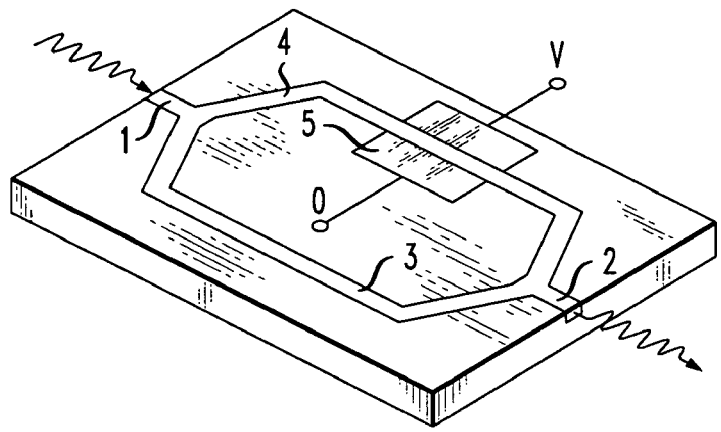
FIG. 1 is a simplified view of an exemplary opto-electronic Mach-Zehnder modulator.

FIG. 1 illustrates an exemplary Mach-Zehnder modulator that may be configured to utilize the AC-coupled differential drive arrangement of the present invention. As shown, the modulator comprises an input waveguide section 1 and an output waveguide section 2. A pair of modulator arms 3 and 4 are shown, where each arm is formed to include a capacitor-like structure. U.S. Pat. Nos. 6,845,198 and 7,065,301 and incorporated herein by reference, describe the formation details of such modulators.

In operation, an incoming continuous wave (CW) light signal from a laser source (not shown) is coupled into input waveguide section 1. The CW signal is coupled into waveguide arms 3 and 4, wherein the application of the electrical drive signal to these arms will provide the desired phase shift to modulate the optical signal, forming a modulated optical output signal along output waveguide 2. A pair of electrodes 5 are illustrated in association with modulator arm 4, where a similar pair are likewise formed along modulator arm 3.

Figure 2:
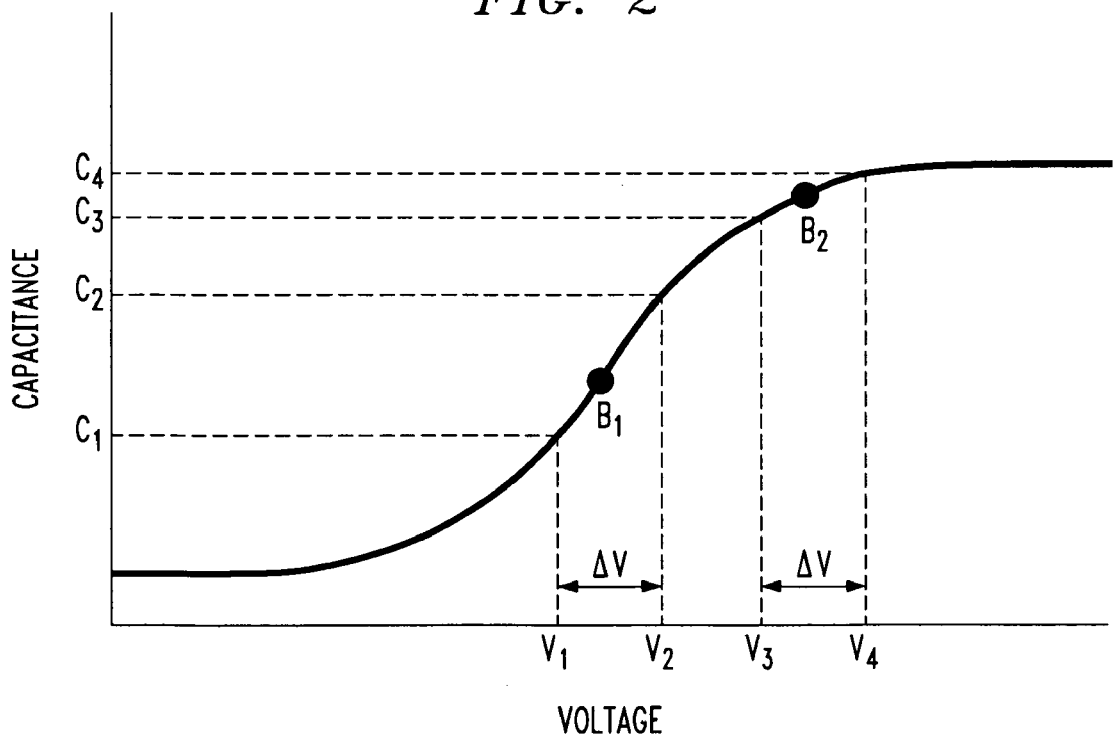
FIG. 2 is a diagram of the C-V characteristic of a capacitor-based modulator arm of the Mach-Zehnder modulator of FIG. 1.

As mentioned above, the "arms" of an exemplary Mach Zehnder modulator, such as that illustrated in FIG. 1, can be modeled as an MOS capacitor having a voltage-varying, non-linear capacitance. The C-V transfer function of this type of modulator is shown in FIG. 2. When modulation is applied to the Mach Zehnder modulator via electrodes 5, the voltage across the modulator arm changes, causing a change in capacitance. Presuming that the electrical driver circuit is initially biased at a voltage $B_1$, a desired voltage 'swing' between $V_1$ and $V_2$ (defining a change in voltage $\Delta V$) produces a change in capacitance between $C_1$ and $C_2$. However, if the driver circuit is instead biased at voltage $B_2$, the same voltage swing $\Delta V$ produces a significantly smaller change in capacitance (see the values for $C_3$ and $C_4$ in FIG. 2). Therefore, the bias applied to the electrical drive circuit will ultimately lead to a very different optical modulation effect. As mentioned above, a desirable property of a modulator driver would be to be able to independently adjust the bias voltage with respect to the voltage swing.

Figure 3:
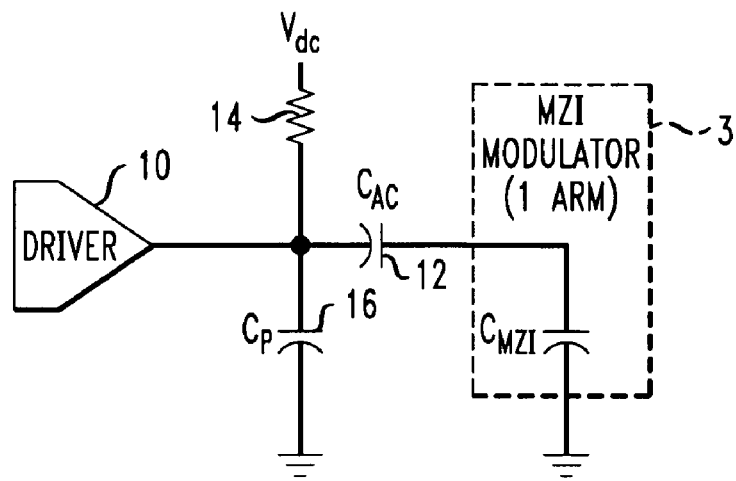
FIG. 3 is an exemplary prior art AC-coupled driver for one arm of a Mach-Zehnder modulator.

One way to alter the bias point independent of the swing of the modulator driver is to AC-couple the driver to the modulator to eliminate the presence of the driver's DC bias voltage. A straightforward AC coupling arrangement is shown in FIG. 3, where a coupling capacitor 12 is disposed between an electrical driver circuit 10 and modulator arm 3 (see FIG. 1). For the purposes of illustration, the modulator arms in each of the remaining drawings is illustrated by its inherent capacitor structure, and labeled as $C_{MZI}$. A separate bias voltage $V_{dc}$ is coupled to the output of driver 10 through a resistor 14.

A particular problem in implementing this basic configuration is that integrated capacitors, such as coupling capacitor 12, suffer from large parasitic capacitances. In the arrangement of FIG. 3, the parasitic capacitor is shown as capacitor 16, and results in an increased load on the output of driver 10. Since parasitic capacitor 16 can approach one-third the size of coupling capacitor 12, the power of driver 10 can become dominated by parasitic capacitor 16 if the size of coupling capacitor 12 exceeds the value of the modulator arm's capacitance by a factor of three, which is a common situation. Given the desire to minimize the effect of the capacitive divider formed by capacitive values $C_{AC}$ and $C_{MZI}$, driver efficiency can be significantly degraded using this basic design.

Figure 4:
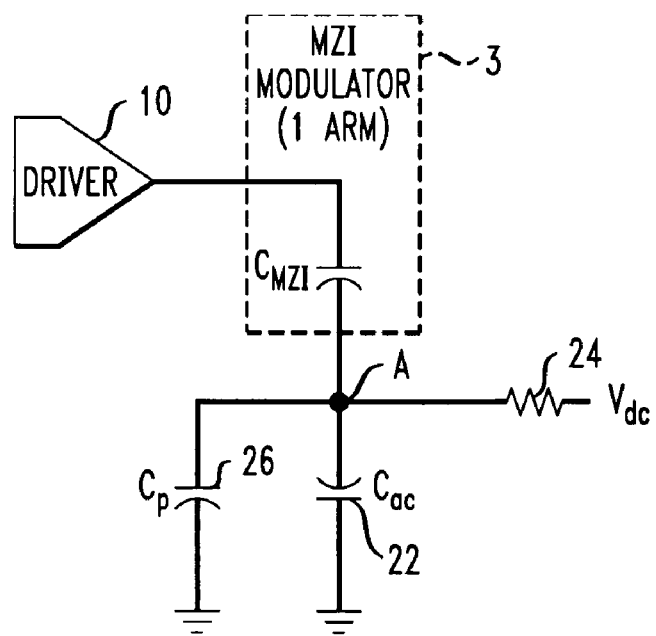
FIG. 4 shows an alternative AC-coupled circuit, coupled to a bottom plate of a modulator arm.

FIG. 4 illustrates an alternative coupling arrangement, where in this case, an AC coupling capacitor 22 is disposed between the "lower plate" of modulator arm 3 and ground potential. A separate bias voltage $V_{dc}$ coupled through a resistor 24 to the node A between modulator arm 3 and coupling capacitor 22. In this embodiment, AC coupling capacitor 22 is disposed in a manner that results in the parasitic capacitance being formed in parallel with the coupling capacitor. As shown in FIG. 4, a parasitic capacitor 26 is now in parallel with coupling capacitor 22. This parallel structure thus reduces the effects of the parasitic capacitance on the output impedance of the arrangement. In the arrangement of FIG. 4, the connection of the bias voltage at node A requires the use of a constant bias. Since most driver designs require variability in their output bias, this arrangement is not considered optimal.

Figure 5:
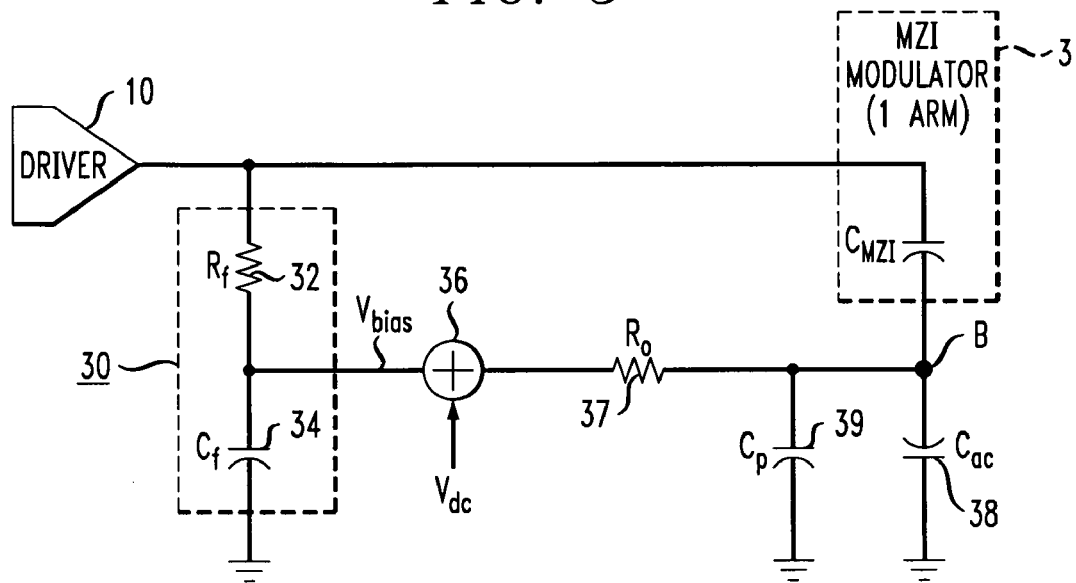
FIG. 5 illustrates the AC-coupled differential drive circuit for a Mach-Zehnder modulator formed in accordance with the present invention.

FIG. 5 illustrates an improvement over the circuit of FIG. 4, where a bias voltage $V_{bias}$ is extracted by a low pass filter 30 formed by a resistor 32 and a capacitor 34 at the output of driver 10. This bias voltage can then be summed with an adjustable (tunable) DC voltage $V_{dc}$ in an adder 36 and then used to bias the bottom plate of the MZI branch 3. In this arrangement, therefore, the bias voltage at both plates of the branch will vary together, resulting in a net DC voltage between the plates that is proportion only to the tunable DC voltage. As with the arrangement of FIG. 4, an AC coupling capacitor 38 is coupled between the "bottom plate" of modulator arm 3 and ground potential (and includes a parasitic, parallel capacitance 39), labeled as node B in FIG. 5. Inasmuch as the arrangement of FIG. 5 still requires the utilization of an external AC coupling capacitor (capacitor 38), there remains a lower frequency limit on the device's operating parameters. In this arrangement, the lower frequency limit is based upon the size of coupling capacitor 38 and the output impedance $R_0$ of DC bias circuit 37.

Figure 6:
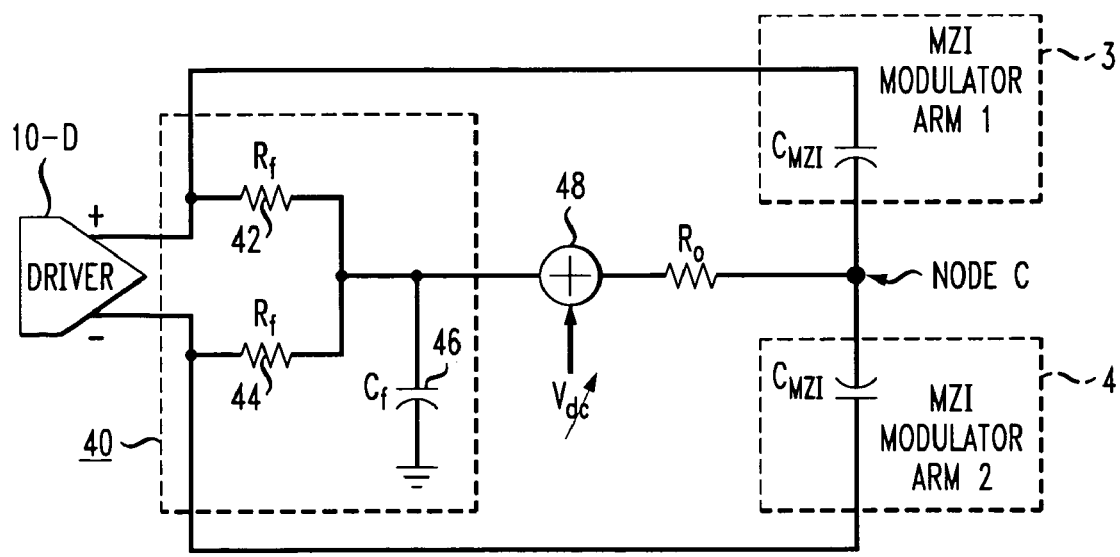
FIG. 6 illustrates an exemplary embodiment of the present invention that utilizes an AC-coupled drive voltage, eliminating the need for a coupling capacitor between the modulator and the driver circuit.

Inasmuch as many modulator drivers actually drive differential signals, it has been found in accordance with the present invention that the need for an external AC coupling capacitor can be eliminated, while still providing the desired AC coupling to eliminate the DC bias associated with the driver circuit. FIG. 6 illustrates the arrangement of the present invention capable of providing an AC-coupled drive voltage without the need for a coupling capacitor. In particular, if the capacitive values of modulator arms 3 and 4 match or nearly match, and the differential output waveforms of driver 10-D are essentially equal and opposite, no net voltage will appear at node C in the configuration of FIG. 6. Since arms 3 and 4 are themselves capacitors, a DC potential can be imposed on the common node C without requiring a low output impedance source. This DC potential can then be used to tune the bias across both branches in the manner described above. In particular, and with reference to FIG. 6, a filtering arrangement 40 is disposed between differential driver 10-D and the modulator common node C, where in this case filtering arrangement 40 includes a pair of resistors 42, 44 coupled between the pair of differential output paths and a capacitor 46. The values of the elements forming filtering arrangement 40 are selected so that the bias voltage of driver 10-D can be eliminated. An independent, adjustable DC voltage $V_{dc}$ is thereafter combined with the modulating voltage in an adder 48, and thereafter imposed on common node C.

In accordance with this embodiment of the present invention, there is no need for a separate, external AC-coupling capacitor, thus removing the lower frequency limit associated with the driver's connection to the modulator. A savings in the size and number of the electrical components is also evident in comparing the arrangement of FIG. 5 to that of FIG. 6.

Although this invention has been described in certain specific embodiments, it is to be understood that this invention may be practiced otherwise than as specifically described without departing from the scope and spirit of the invention as set forth in the claims and their equivalents.

What is claimed is:

1. An integrated circuit for coupling an electrical driver to an optical modulator comprising an input waveguiding section and an output waveguiding section with a pair of parallel waveguide modulator arms disposed therebetween, the modulator arms responsive to the outputs from the electrical driver and coupled together so as to define a common node, the integrated circuit comprising a low pass filter coupled between the driver output and the modulator common node and configured to extract a DC bias voltage associated with the electrical driver; and an adder for combining a separate, independent DC voltage source with the output of the low pass filter at the modulator common node to provide a desired DC bias voltage to each waveguide modulator arm of the optical modulator.

2. The integrated circuit as defined in claim 1 wherein the electrical driver is a differential driver and the low pass filter is coupled between both outputs of the differential driver and the modulator common node.

3. An integrated circuit as defined in claim 1 wherein the low pass filter comprises a resistor and a capacitor coupled in series between the electrical driver output and ground potential, the intermediate connection between the resistor and the capacitor coupled to the input of the adder.

4. An integrated circuit as defined in claim 1 wherein the adder is configured to receive as an input an adjustable DC bias voltage from the separate DC voltage source.

5. An integrated circuit as defined in claim 1 wherein each modulator arm comprises a capacitor structure including a top plate, intermediate dielectric and a bottom plate, the bottom plates coupled together to define the common node.

6. An integrated circuit as defined in claim 1 wherein the optical modulator comprises an SOI-based optical modulator.

* * * * *